United States Patent
Stimpfl

[11] Patent Number: 6,041,684
[45] Date of Patent: Mar. 28, 2000

[54] DEVICE FOR SEPARATING CURVED SAUSAGES FROM A STRING OF SAUSAGES

[75] Inventor: Christof Stimpfl, Vogt, Germany

[73] Assignee: Stimpfl + Gieseler GmbH, Germany

[21] Appl. No.: 09/003,422

[22] Filed: Jan. 6, 1998

Related U.S. Application Data

[63] Continuation of application No. 08/600,774, Feb. 13, 1996, abandoned.

[51] Int. Cl.[7] .......................................... B26D 7/01
[52] U.S. Cl. .................. 83/155; 83/278; 83/282; 83/409.1; 83/410; 83/411.7; 83/932
[58] Field of Search ............................. 83/155, 267, 276, 83/282, 422, 409.1, 409, 410, 410.7, 410.8, 410.9, 411.7, 210, 271, 444, 932; 452/46, 49, 50; 198/626.6

[56] References Cited

U.S. PATENT DOCUMENTS

| | | | |
|---|---|---|---|
| 3,487,499 | 1/1970 | Klyce | 452/50 |
| 3,545,035 | 12/1970 | Piereder | 452/49 |
| 3,659,316 | 5/1972 | Berendt et al. | 452/49 |
| 4,322,871 | 4/1982 | Townsend et al. | 452/49 |
| 4,373,231 | 2/1983 | Mano | 452/49 |
| 4,524,658 | 6/1985 | Focke et al. | 83/422 |

FOREIGN PATENT DOCUMENTS

| | | |
|---|---|---|
| 4318301 | 2/1996 | Germany . |
| 19500656 | 7/1996 | Germany . |

*Primary Examiner*—M. Rachuba
*Attorney, Agent, or Firm*—Bachman & LaPointe, P.C.

[57] ABSTRACT

In an apparatus for the separating of curved sausages (2) from a sausages string (3) by means of a cutting device at a cutting place (31), the sausages string (3) is fed in an arc to the cutting place (31). In this connection, the arc is defined by at least one guide belt (8, 9) which rests at least partially against the sausage (2) or the sausages string (3).

16 Claims, 3 Drawing Sheets

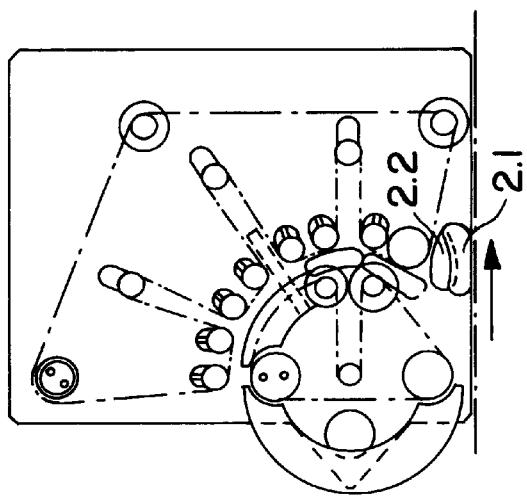
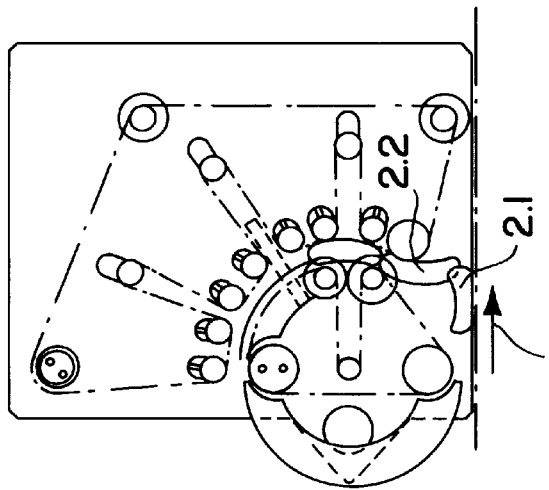
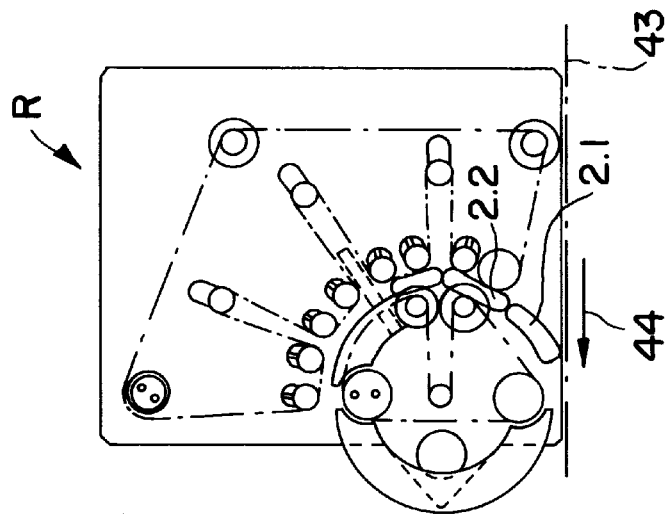

DEVICE FOR SEPARATING CURVED SAUSAGES FROM A STRING OF SAUSAGES

This is a Continuation, of application Ser. No. 08/600,774, filed Feb. 13, 1996, abandoned.

BACKGROUND OF THE INVENTION

The present invention relates to an apparatus for separating curved sausages from a string of sausages by a cutting device at a cutting place. The string of sausages is fed in an arc to the cutting place.

From Federal Republic of Germany Patent OS 43 18 301.8, an apparatus for separating sausages from a string of sausages is known in which the string of sausages is fed to a cutting place along a straight line. In front of the cutting place, there is a sensor which recognizes a place to be cut between two sausages and, on the basis of corresponding parameters, imparts a signal to a knife in the cutting place so that this knife cuts precisely through the region between two sausages. The cutting device has proven to be extremely good for the cutting of straight sausages from a string of sausages. However, it can be used only for straight, or merely slightly curved, sausages. In particular, sausages having a natural casing are, however, frequently very strongly curved so that this device cannot be used since the sausages may be damaged when bent straight.

A machine manufactured by the Thurne company is available on the market for the separating of curved sausages from a string of sausages. In it, the sausages on the string of sausages are fed in arcuate shape to a cutting place. The sausages are conducted between rollers which press against the sausages only along a transverse line. This guidance is very imprecise so that there is frequently a malfunctioning of the cutting place. The rejects by way of damaged sausages are therefore very high in the case of this machine.

SUMMARY OF THE INVENTION

The object of the present invention is to create an apparatus of the above-indicated type in which a precise and gentle separation of the curved sausages from a string of sausages is possible.

In order to achieve this object, the arc along which the string of sausages is fed to the cutting place is limited by at least one guide belt which rests at least partially against the sausage or string of sausages.

An essential advantage of this guide belt is that there is no longer any rolling of the sausage, but the guide belt lies two-dimensionally over at least a partial region of the sausage. In this way, damage upon the guidance of the sausage is avoided.

Preferably, however, an inner guide belt and an outer guide belt form an arcuate guide channel. In other words, the sausage is held and transported further by both guide belts. Abrasion of the sausage or the like does not take place.

In order that the inner guide belt lies over as long a distance as possible on the sausage, it is guided at least in part within a curved trough. In this way, the inner guide belt adapts itself to the shape of the sausage over a part of the guide path.

The outer guide belt should also rest against the sausage over a part of its length. For this, it is provided that the outer guide belt wrap around a plurality of pairs of adjustment rollers the axes of which are spaced at a given distance from each other. In this way, it is possible for the outer guide belt also to rest against the corresponding sausage in the region of this spacing and for the sausage to be held between the outer guide belt and the inner guide belt.

The adjustment of the width of the guide channel to a specific thickness of sausage is provided for by the provision of pairs of adjustment rollers on a displacement device. Of course, the inner guide belt could also be developed adjustable in corresponding manner. The development of this displacement device is of minor importance. In one simple embodiment, the corresponding adjustment rollers are suspended by bars from a cross member and can move in corresponding holes in said cross member and be fixed in position by nuts for instance. In this connection, however, many developments which are covered by the inventive concept are possible.

A sensor is preferably arranged between two pairs of adjustment rollers in front of the place of cutting in order to detect the place of cutting between two sausages. One embodiment of a preferred sensor, which is developed as a light curtain, is described in the above-mentioned German patent application. There is also mentioned therein a cutting place which can preferably be transferred to the present invention. At least in the region of the cutting place, both the outer guide belt and the inner guide belt are deflected by corresponding guide or deflection rollers, so that a knife can move freely at the place of cutting.

Another essential feature of the invention resides in a deflecting of the sausage behind the cutting place. In many cases, the ends of the sausages are very close to each other so that cutting into one end of a sausage can occur at the cutting place. This is undesirable since the rejects are thereby substantially increased. In order, therefore, to be able to make the place of cutting between two sausages more accessible to the knife, the sausage, in accordance with the invention, is to be more strongly deflected behind the cutting place than in front of the cutting place. This means that a wedge-shaped region into which the knife can enter is produced between two sausages.

A stronger deflection of the sausage behind the cutting place is effected, for instance, in the manner that a second adjustment roller behind the cutting place has a larger diameter than a first adjustment roller. However, other possibilities are conceivable for this and are also covered by the present invention.

In order to improve the maintenance and accessibility of the apparatus of the invention, the two guide belts together with their guiding and deflecting rollers as well as their drive rollers are preferably arranged on a side wall of a housing. This side wall is then attached by suitable hinges to a rear wall, so that the side wall can be swung open and the inside of the apparatus is accessible.

In many cases, it has proven desirable to separate the sausages in pairs from the string of sausages. The present invention permits also the depositing of these sausages in pairs onto a conveyor, for instance a conveyor belt. For this pairwise depositing, the conveyor belt is first of all moved a distance in the direction in which the first sausage comes from the cutting place. As soon as this sausage lies on the conveyor belt and shortly before the second sausage leaves the guide channel, the conveyor belt is moved in the opposite direction so that the second sausage is deposited alongside the first sausage. In this way, the orderly depositing of a pair of sausages is also automatically effected.

The inventor has also had a novel idea with regard to the introduction of the string of sausages into the apparatus. On the one hand, an arcuate guide trough onto which the string of sausages can be placed from the outside is preferably arranged in front of the inner guide belt. This string of sausages is, in accordance with the invention, brought to a chute and then deflected by a projection towards the guide trough. In order to improve an adjustment of this chute with respect to the guide mold or the entrance slot into the apparatus for the separating of the curved sausages, the chute should be both tiltable and adjustable in height.

BRIEF DESCRIPTION OF THE DRAWINGS

Other advantages, features, and details of the invention will become evident from the following description of preferred embodiments, read with reference to the drawings, in which:

FIGS. 3 to 5 are side views of a part of the apparatus of FIG. 1 with the side wall omitted, shown in different operating stages.

DETAILED DESCRIPTION OF THE PREFERRED EMBODIMENTS

Figure 1:
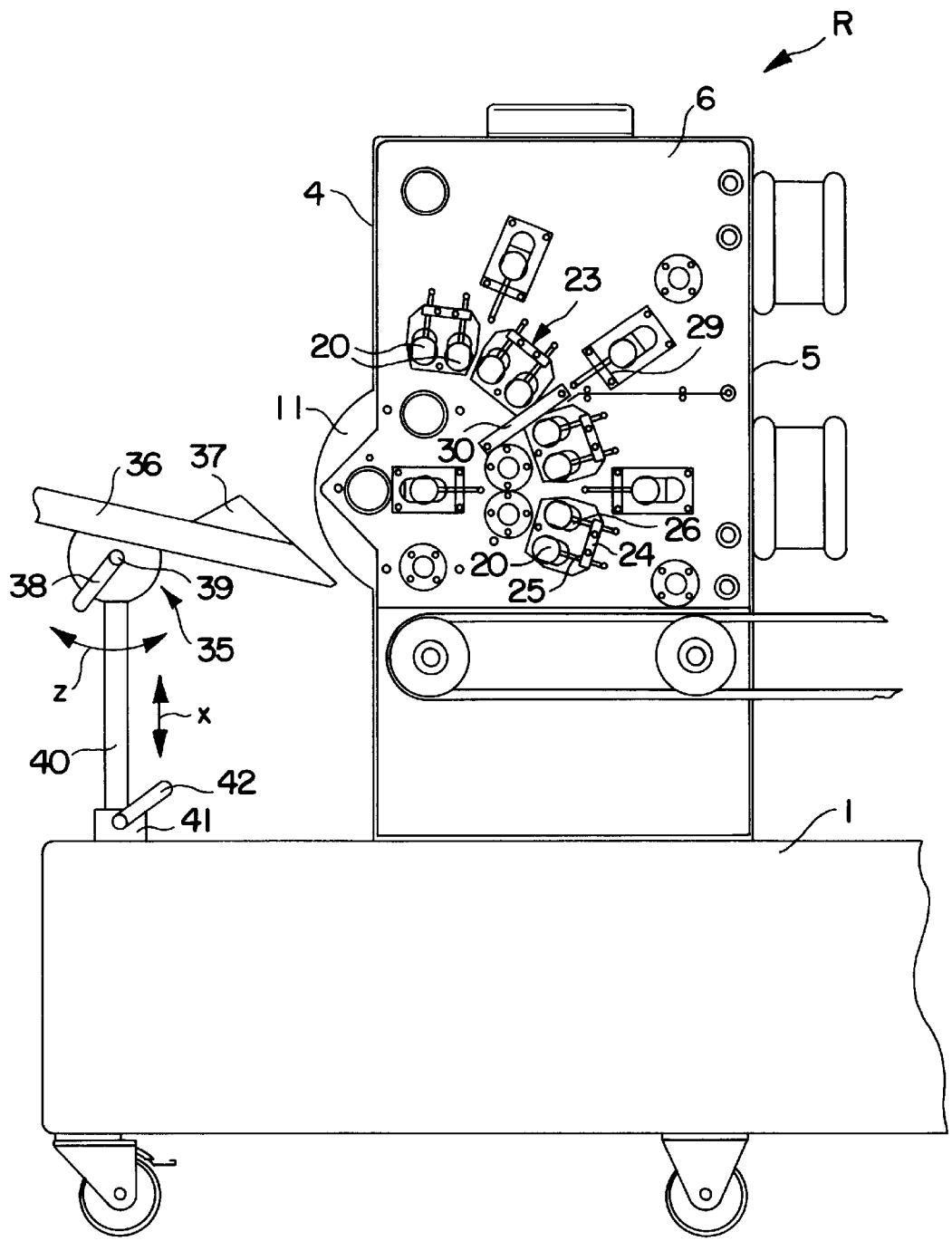
FIG. 1 is a side view of an apparatus in accordance with the invention for separating curved sausages from a string of sausages.

In accordance with FIG. 1, an apparatus R in accordance with the invention for the cutting of curved sausages 2 (see FIG. 2) from a sausages string 3 is seated on a roller carriage 1. This apparatus R consists of a box-shaped housing having a front wall 4, a rear wall 5, and two side walls 6. At least one side wall 6 is preferably attached by hinges 7 to the rear wall 5 so that said side wall 6 can be swung open.

An outer guide belt 8 and 9 indicated by dashed lines are associated in the present embodiment with the side wall 6 belts 8, 9 form a guide channel 10 within which the sausage string 3 is guided. The sausage string 3 enters into this guide channel 10 through an entrance slot (not shown in detail) in the front wall 4. For the aligning of the sausages 2, a curved guide trough 11 is associated with the front wall 4 below the entrance slot.

From the guide trough 11, the sausage string 3 is transferred to the guide belt 9, this being done in the present embodiment in the region of a drive pulley 12. This guide belt 9 then passes through another trough 13 having the shape of a section of an arc and then wraps in the manner of a block and tackle around three pulleys 14, 15, and 16. A cutting slot 17 is formed between the pulleys 14 and 16.

From the pulley 16, guide belt 9 passes around a lower pulley 18 back to the drive pulley 12. As a whole, the belt 9 has described approximately half a circle.

The guide belt 8 also wraps around a drive pulley 19 and then, for the formation of the guide channel 10, around a plurality of pairs of adjustment rollers 20 each of which is displaceably mounted in a slot 21 in the side wall 6. Since the axes A and B of the pairs of adjustment rollers 20 are at a distance a from each other, a section 22 of guide belt 8 also extends linearly in this region a so that a pressing surface for each sausage 2 is formed. In this way, the guiding of the sausage 2 or of the sausage string 3 is substantially improved.

As can be noted from FIG. 1, each pair of adjustment rollers 20 is arranged on a displacement device 23. This displacement device 23 permits a radial displacement of each pair of adjustment rollers 20 or of each adjustment roller in the direction towards the guide channel 10.

For the sake of simplicity, the displacement device 23 consists of a cross member 24 which is passed through at both ends by support rods 25 and 26 respectively. By means of suitable set screws, the support rods 25 and 26 can be detached from or fastened to the cross member 24. On each of the support rods 25 and 26 there is an adjustment roller.

Figure 2:
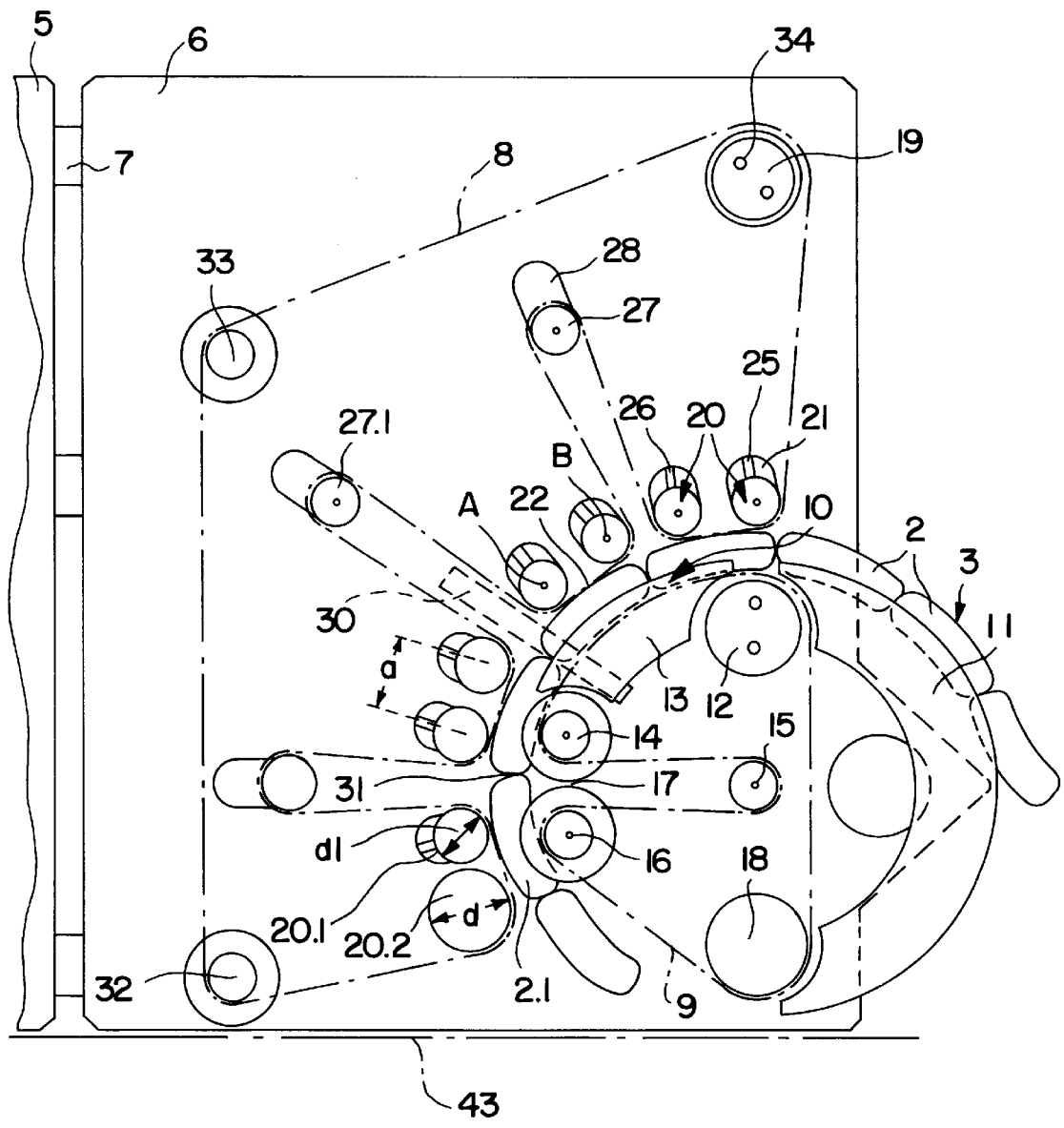
FIG. 2 is a view of the inner side of a side wall of the apparatus of FIG. 1.

In FIG. 2, it can be noted that the belt 8 wraps around an equalization roller 27 between each pair of adjustment rollers 20, the equalization roller being also displaceable in a slot 28. This equalization roller 27 also has associated with it a corresponding displacement device 29 which is constructed similar to the displacement device 23 mentioned above, but is suitable only for one equalization roller 27. Therefore, further description is dispensed with.

The purpose of the equalization roller 27 is to equalize a displacement of the pair of adjustment rollers 20, in which connection, upon the displacement of the adjustment rollers, a width of the guide channel 10 can be changed. In this way, curved sausages of different thickness are taken into account.

Furthermore, between two pairs of adjustment rollers 20 in the region of the deflection of the belt 8 around the equalization roller 27.1 there is a sensor 30 by which a cutting place between two sausages 2 is recognized. As a rule, the cutting place is a lathe-cutting place or a cutting place provided with one or two clips between two sausages.

Preferably in the next following region between two pairs of adjustment rollers 20 there is then provided a cutting device (not shown in detail). A knife (not shown in detail) passes, for the cutting of the sausages 2 off from a sausage string 3, through the cutting slot 17 and a cutting place 31 between two sausages 2.

One essential feature of the invention is that the adjustment rollers of the pair of adjustment rollers which follows the cutting place 31 are developed differently. One adjustment roller 20.1 corresponds to the other adjustment rollers. One adjustment roller 20.2, however, has a diameter d which is larger than a diameter $d_1$ of the adjustment roller 20.1. In this connection, the axis of this adjustment roller 20.2 also lies on approximately the same circular arc around an imaginary center point of the arcuate guide channel 10 as the axes of the other adjustment rollers. In this way, assurance is had that the sausage 2.1 which is just to be cut off from the sausage string 3 is bent more strongly, so that the cutting place 31 between the two sausage ends opens up in wedge shape. The cutting knife can move substantially better into this wedge-shaped cutting place 31 without one of the two sausage ends to be separated from each other being damaged.

Behind the adjustment roller 20.2, the belt 8 is conducted over further pulleys 32 and 33 back to the drive pulley 19. Both drive pulley 19 and drive pulley 12 preferably have a plug opening 34 to receive a drive pin (not shown in detail) of a drive. Upon the closing of the side wall 6, these drive pins, which are present within the housing of the apparatus R, engage into these plug openings.

For the better guidance of the sausages 2, both belts 8 and 9 or only one of them can be developed as a toothed belt. A double-sided toothed belt is also possible.

The guide trough 11 below the entrance slot for the sausage string 3 preferably has a feed device 35 associated with it, which device is also placed on the roller an carriage 1. This feed device 35 has a chute 36 which, towards its end, has the wedge-shaped headpiece 37. By this headpiece 37, a sausage string 3 arriving in the chute 36 is deflected towards the guide trough 11.

In order to have better passage of the sausage string 3 to the guide trough 11 and the entrance slot, this chute 36 is tiltable. By loosening a quick-release lock 38, the chute 36 can be turned in the direction indicated by the double-ended arrow z. A turning is effected preferably around an axis 39 of this quick-release lock 38. Furthermore, the chute 36 should also be adjustable in height in the direction indicated by the double-ended arrow x. For this purpose, a tube 40 connected with the chute 36 or axis 39 passes through a bushing 41 on the roller carriage 1, this being adapted to slide in the bushing 41 in the direction indicated by the double-ended arrow x. Fastening of the tube 40 is also effected by means of a quick-release lock 42.

When the sausages 2 have been separated individually from the sausage string 3, they fall below the cutting place 31, for instance into a container, onto a conveyor belt 43 indicated in dashed line, or onto some other suitable conveyor or packing means. However, there are also cases in which it is desirable that the sausages be separated in pairs from the sausage string 3. In order that a suitable pairwise arrangement takes place on a conveyor belt 43 after the cutting, this conveyor belt 43 is, in accordance with the invention, moved briefly in the direction indicated by the arrow 44 in FIG. 3, carrying the sausage 2,1 along with it. The belt is then moved opposite to the direction of the arrow 44 in the direction of the arrow 45 (see FIG. 4), so that now the second sausage 2.2 can be deposited alongside the first sausage 2.1. The pair of sausages is then, as shown in FIG. 5, removed from the apparatus R either in the direction of the arrow 44 or in the direction of the arrow 45.

The invention claimed is:

1. An apparatus for separating curved sausages from a sausage string, which comprises:
    at least one outer guide belt at least partly defining a guide channel for aligning a sausage string in an arc to a cutting position having a cutting slot;
    a plurality of pairs of adjustment rollers on said arc guiding the outer belt and defining with the outer belt a plurality of arcuate belt sections so that lengths of each arcuate belt section contact said sausage string;
    means for feeding said sausage string in said arc to said cutting position; and
    means for cutting at least one sausage from said sausage string at said cutting position.

2. An apparatus according to claim 1, wherein said guide channel is an arcuate guide channel which includes a plurality of arcuate guide sections defined by said outer guide belt and an inner guide belt.

3. An apparatus according to claim 2, wherein the inner guide belt is guided at least partially within a curved trough.

4. An apparatus according to claim 2, including an arcuate guide trough upstream of said guide channel.

5. An apparatus according to claim 1, wherein said outer guide belt contacts said plurality of pairs of said adjustment rollers.

6. An apparatus according to claim 5, wherein each adjustment roller has axes, and wherein the axes of each adjustment roller is spaced a distance from an adjacent adjustment roller.

7. An apparatus according to claim 6, wherein the outer guide belt contacts at least two pairs of adjustment rollers and also contacts at least one equalization roller which is offset and spaced radially from the arcuate guide channel and from the adjustment rollers.

8. An apparatus according to claim 5, including a sensor provided between two pairs of adjustment rollers adjacent the cutting slot in order to detect a cutting position between two sausages.

9. An apparatus according to claim 5, wherein the adjustment rollers have a diameter and wherein the diameter of at least one adjustment roller downstream of the cutting slot is different from the diameter of at least one adjustment roller upstream of the cutting slot.

10. An apparatus according to claim 9, wherein the diameter of a first adjustment roller downstream of the cutting slot is smaller than the diameter of a second adjacent adjustment roller downstream of the cutting slot.

11. An apparatus according to claim 1, including a housing for said apparatus with a side wall thereof, wherein said outer guide belt is positioned on said side wall of said housing.

12. An apparatus according to claim 11, wherein said adjustable rollers are positioned on said side wall.

13. An apparatus according to claim 1, including a conveyor device below the cutting position, wherein the conveyor device carries out movements in an upstream and downstream direction to place pairs of sausages together.

14. An apparatus according to claim 1, including means for radial displacement of each pair of adjustment rollers.

15. An apparatus according to claim 7, including means for radial displacement of said equalization roller.

16. An apparatus according to claim 1, wherein said outer guide belt wraps around a plurality of pairs of said adjustment rollers.

* * * * *